P. SPEELMON.
Sulky-Harrows.

No. 144,231. Patented Nov. 4, 1873.

UNITED STATES PATENT OFFICE.

PETER SPEELMON, OF KNOX, INDIANA.

IMPROVEMENT IN SULKY-HARROWS.

Specification forming part of Letters Patent No. 144,231, dated November 4, 1873; application filed September 15, 1873.

*To all whom it may concern:*

Be it known that I, PETER SPEELMON, of Knox, county of Starke and State of Indiana, have invented certain new and useful Improvements in Sulky-Harrows, of which the following is a specification:

My invention consists in constructing a harrow of two sectional frames or halves, which are hinged together, and attached to a sulky by means of chains, by which the harrow is dragged when in use, and in arranging levers upon fulcrums on the sulky in such manner that, by means of rods leading from one end of each of said levers, either the whole harrow may be raised clear of the ground, or so that the teeth may penetrate to any desired depth, or either of the halves may be swung up on its hinges out of the way of stumps or other obstructions.

Figure 1:
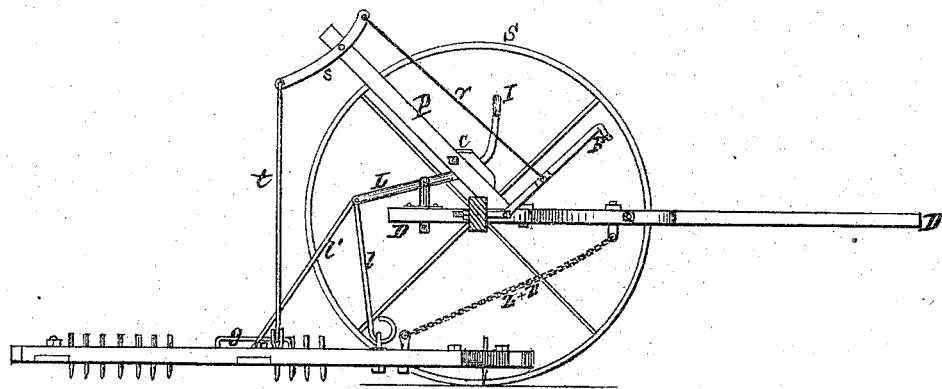
Figure 2:
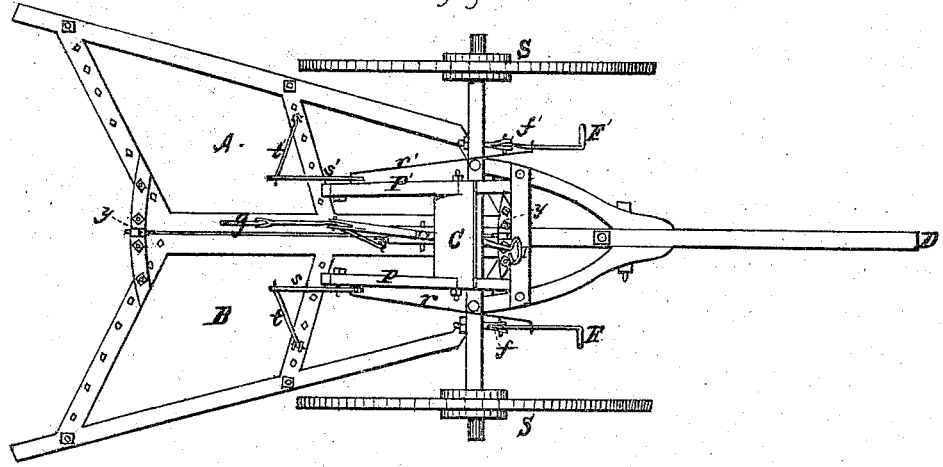

In the drawing, Figure 1 is a view of my invention, taken partly in section, with one of the sections swung up. Fig. 2 is a plan.

A and B are the sectional frames, hinged together at $y\ y'$. $z\ z'$ are chains, by which each section is hitched to the sulky S. L is a lever, pivoted to a fulcrum-stud arranged upon a rear extension of the draft-pole D; or it may be upon the axle-tree. The forward end I of this lever is bent up, so as to be conveniently worked by the hand of the driver as he sits upon his seat C. To the rear end of the lever L are jointed two rods, $l\ l'$, one of which is also jointed to the inner side of each of the sectional frames A and B. F F' are levers, pivoted to bolts $f f'$ in the axle-tree of the sulky, and the ends of these levers are bent so as to form footholds for the driver when he desires to operate them. From about the middle of these levers F F' rods $r\ r'$ extend to the forward ends of levers $s\ s'$, which are pivoted near the tops of the standards P P'. From the after ends of levers $s\ s'$ rods $t\ t'$ lead down and are jointed to the sectional frames A and B, one of the rods to each middle cross-piece of the sections. For greater convenience in handling the harrow, the rear rod, $l'$, attached to lever L, is adjustably attached to the sectional frame, the long staple $g$ being screw-threaded, and having a nut upon it, by means of which the position of the end of lever $l'$ is regulated, shortening or lengthening the distance of raising the harrow by the lever L.

The operation is as follows: When the horses are hitched to a sulky-harrow constructed as described, the driver takes his seat, and with his right hand bears down upon the lever L, and thus swings the entire harrow clear of the ground. The lever L is secured by a suitable catch, and the sulky-harrow is driven to the field where it is to be used. The harrow is then lowered, and work begun. During the process of harrowing, if a stump is encountered directly in front of the harrow, it (the harrow) is raised, by means of lever L, so as to pass over. If the obstruction is on either side of the center of the harrow, then the hinged section on that side is swung upward on its hinges by means of lever F or F', as the case may be, operated by the foot of the driver; or, if it is desired to harrow a particular patch of ground only to a certain depth without the trouble of changing the set of the harrow-teeth, by means of the lever L any desired stroke may be given the teeth.

Having now fully described the construction and operation of my invention, I claim—

1. The adjustable attachment $g$, in combination with rods $l\ l'$ and the sectional harrow, as and for the purpose set forth.

2. The combination of standards P P', levers $s\ s'$, rods $r\ r'$, $t\ t'$, and foot-levers F F' with the sectional harrow and levers $l\ l'$, substantially as set forth.

In testimony that I claim the foregoing as my invention I hereunto affix my signature.

PETER SPEELMON.

Witnesses:
    J. E. SHORT,
    A. P. DIAL.